(12) United States Patent
Kerschner et al.

(10) Patent No.: US 6,174,956 B1
(45) Date of Patent: *Jan. 16, 2001

(54) SYNTHESIS OF CONDENSATION POLYMERS IN DENSIFIED FLUIDS

(75) Inventors: Judith Lynne Kerschner, Fair Lawn; Sharon Harriott Jureller, Haworth; John Socrates Thomaides, Berkeley Heights; Robert William Humphreys, Annandale; Carmine Phillip Iovine, Bridgewater, all of NJ (US)

(73) Assignee: National Starch and Chemical Investment Holding Corporation

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/800,371

(22) Filed: Feb. 14, 1997

Related U.S. Application Data

(63) Continuation-in-part of application No. 08/460,357, filed on Jun. 2, 1995, now abandoned.

(51) Int. Cl.[7] ................ C08J 3/03; C08J 3/05; C09D 175/05; C09D 175/08
(52) U.S. Cl. ............... 524/591; 524/424; 524/839; 524/840; 528/48; 528/59; 528/61; 528/62; 528/65; 528/70; 528/71; 528/73; 528/76; 528/80; 528/85
(58) Field of Search ................ 524/591, 424, 524/840, 839; 528/78, 76, 80, 85, 70, 59, 65, 61, 62, 73, 71

(56) References Cited

U.S. PATENT DOCUMENTS

| 3,412,054 | | 11/1968 | Milligan et al. | 524/591 |
|---|---|---|---|---|
| 4,501,852 | * | 2/1985 | Markusch et al. | 524/591 |
| 4,857,368 | | 8/1989 | Klein | 427/393 |
| 4,876,302 | * | 10/1989 | Noll et al. | 524/591 |
| 4,882,107 | | 11/1989 | Cavender et al. | 264/51 |
| 4,906,672 | * | 3/1990 | Stone et al. | 521/130 |
| 5,039,733 | * | 8/1991 | Dormish et al. | 524/591 |
| 5,200,435 | | 4/1993 | DeGenova et al. | 521/159 |
| 5,387,619 | * | 2/1995 | Lee et al. | 521/133 |
| 5,419,487 | * | 5/1995 | Nielsen et al. | 239/10 |
| 5,466,490 | * | 11/1995 | Glancy et al. | 427/422 |

FOREIGN PATENT DOCUMENTS

| 0 506 041 A2 | 9/1992 | (EP) . |
|---|---|---|
| 91822 | 6/1987 | (RO) . |
| 1669924 | 8/1991 | (SU) . |

OTHER PUBLICATIONS

Krukonis; "Processing of Polymers with Supercritical Fluids"; *Polymer News*; vol. 11; 1985; pp. 7–16.*

D. Dieterich, W. Keberle, and H. Witt, *Polyurethane Ionomers, a New Class of Block Polymers*, Angew. Clem. Internet. Edit., vol. 9 (1970) No. 1, pp. 40–45.

James W. Rosthauser and Klaus Nachtkamp, *Waterborne Polyurethanes*, Adv. Urethane Sci. TEchnol., vol. 10, 1987, pp. 121–162.

D. Dieterich, Acqueous Emulsions, Dispersions and Solutions of Polyurethanes; Synthesis and Properties, Progress in Organic Coatings, 9 (1981) 281–340.

Selected pages from *Encyclopedia of Polymer Science and Engineering*, vol. 11, 1988, pp. 648–655.

Selected pages from *Encyclopedia of Polymer Science and Engineering*, vol. 12, 1988, pp. 1–14, 10–15

* cited by examiner

*Primary Examiner*—Rabon Sergent
(74) *Attorney, Agent, or Firm*—Karen G. Kaiser, Esq.; Laurelee A. Duncan

(57) ABSTRACT

A polyurethane polymer and method of preparing it is described. The process requires the combination of a soluble polyol with a di- or polyisocyanate under densified fluid conditions. The process to prepare a waterborne polyurethane involves the utilization of a polyol containing ionic or latent ionic groups which must undergo preneutralization before combining with the di- or polyisocyanate under densified fluid conditions. The resulting polyurethane is substantially free of an organic solvent.

9 Claims, 1 Drawing Sheet

SYNTHESIS OF CONDENSATION POLYMERS IN DENSIFIED FLUIDS

RELATED APPLICATION

This application is a continuation-in-part of U.S. Ser. No. 08/460,357 filed Jun. 2, 1995, now abandoned.

FIELD OF THE INVENTION

This invention relates to the synthesis of condensation polymers, such as polyurethanes using densified fluids.

BACKGROUND OF THE INVENTION

The conventional methods for producing condensation polymers involve reacting molecules containing complimentary functional groups in an organic solvent. For example, the production of a polyurethane traditionally comprises the reaction of a polyisocyanate with an active hydrogen species in the presence of an organic solvent, such as acetone.

One specific type of polyurethane synthesis is the preparation of waterborne polyurethanes which typically contain an internal emulsifier in the polyurethane chain. Such internal emulsifiers are typically active hydrogen bearing compounds that contain ionic or latent ionic functionality, or some other water soluble moiety. An important class of internal emulsifier useful for the preparation of polyurethane dispersions is dihydroxy carboxylic acids which is exemplified by dimethylol propionic acid (DMPA). These polymers which show hydrophilic ionic sites between predominantly hydrophobic chain segments spontaneously form stable dispersion in water without the influence of shear forces and in the absence of dispersants.

The aqueous polyurethane dispersion can be obtained by first reacting a diisocyanate or mixture of diisocyanates with a polyol, alone or with other active hydrogen compounds, and a suitable amount of a polyol containing an ionic or latent ionic functionality in an organic solvent. The ratio of isocyanate functionality to active hydrogen groups is chosen such that a high molecular weight polyurethane is obtained. The latent ionic functionality present in the polyurethane chain is then neutralized with a suitable base to provide ionic functionality. Water is added to the solution of the ionic polyurethane in organic solvent until water becomes the continuous phase. A fully aqueous dispersion can be obtained by distilling the organic solvent from the resulting mixture. See Rossthauser, J. W. et al., "Waterborne Polyurethanes", *Advanced Urethanes Sci Technology*, Vol. 10, 1987, pp. 121–162.

Alternatively, a prepolymer with free isocyanate groups can be prepared by reacting a diisocyanate or mixture of diisocyanates with a polyol, alone or with other active hydrogen compounds and a suitable amount of a polyol containing an ionic or latent ionic functionality employing an excess of isocyanate functionality relative to active hydrogen species. After neutralization of the prepolymer to develop the ionic functionality, the prepolymer is dispersed rapidly in water. The molecular weight of the prepolymer is increased by chain extension in water usually with a di- or polyfunctional amine or diol. Typically, it is necessary to use some organic cosolvent in the prepolymer synthesis in order to control the viscosity of the prepolymer. A fully aqueous dispersion is obtained by distilling the cosolvent from the dispersion, or the solvent is left in the dispersion. Supra.

The presence of the organic cosolvent is a disadvantage in both cases. Removal of this solvent requires time and energy and is commercially uninteresting. Simply leaving the solvent in the dispersion is often unacceptable as the object of preparing water-borne polyurethanes is to eliminate organic solvent at the point of product use.

Aqueous media have replaced solvents in synthetic production of systems such as polyurethanes, however, it is well known that in the reaction between the polyisocyanate and polyol to produce the polyurethane that a third reaction comes into play with the reaction of the polyisocyanate with water. Water hydrolyzes isocyanate groups to yield the amines via the unstable carbamic acid with the evolution of carbon dioxide. Supra.

Densified, particularly supercritical, fluids offer a desirable alternative to both solvent and aqueous based synthetic methods. Densified carbon dioxide provides a non-toxic, inexpensive, recyclable and environmentally acceptable solvent and heretofore has not been utilized in the synthesis of condensation polymers.

Supercritical fluids, such as supercritical carbon dioxide, have been used in a process to produce condensation polymers, such as polyurethanes, polyepoxides, polyesters and polycarbonates, etc. by inhibiting the chemical reactions between the functional groups of the organic materials. See EP 506 041 (Union Carbide). The publication describes the inhibition of a reaction between a polyol and a diisocyanate for up to ten hours under supercritical conditions. When the conditions are reduced to atmospheric conditions, the two materials react instantly. The publication describes the selection of one or more compounds which are not soluble in supercritical fluids to separate the compounds effectively and prevent the condensation reaction from occuring until the supercritical fluid conditions are no longer present.

Carbon dioxide has also been used at atmospheric pressures as a blowing agent to form flexible polyurethane foams. See U.S. Pat. No. 5,200,435 (The Dow Chemical Company). Although it was found desirable to replace chlorofluorocarbon blowing agents with carbon dioxide for environmental reasons, in general the use of carbon dioxide generating blowing agents results in flexible polyurethane foams with poor physical properties such as tear strength, tension strength and elongation.

There thus exists a need for an improved synthetic method for the production of condensation polymers, such as polyurethanes, which produces a final product free of solvent residue in high yields and which is both environmentally friendly and cost effective.

SUMMARY OF THE INVENTION

These and other objects of the invention are achieved by the formation of polyurethane polymers from the combination of a soluble polyol with a di- or polyisocyanate under densified fluid conditions. The process to prepare a waterborne polyurethane involves the utilization of a polyol containing ionic or latent ionic functional groups which must undergo preneutralization before combining with the di- or polyisocyanate under densified fluid conditions.

Densified fluid conditions include pressures ranging between 700 and 10,000 psi, preferably 800 to 6,000 psi and temperature ranges of about 0C to about 200° C. for a reaction time of from about ten minutes to about thirty-six hours.

The polyurethanes formed from the inventive method are substantially free of solvent residue.

DETAILED DESCRIPTION OF PREFERRED EMBODIMENTS

Figure 1:
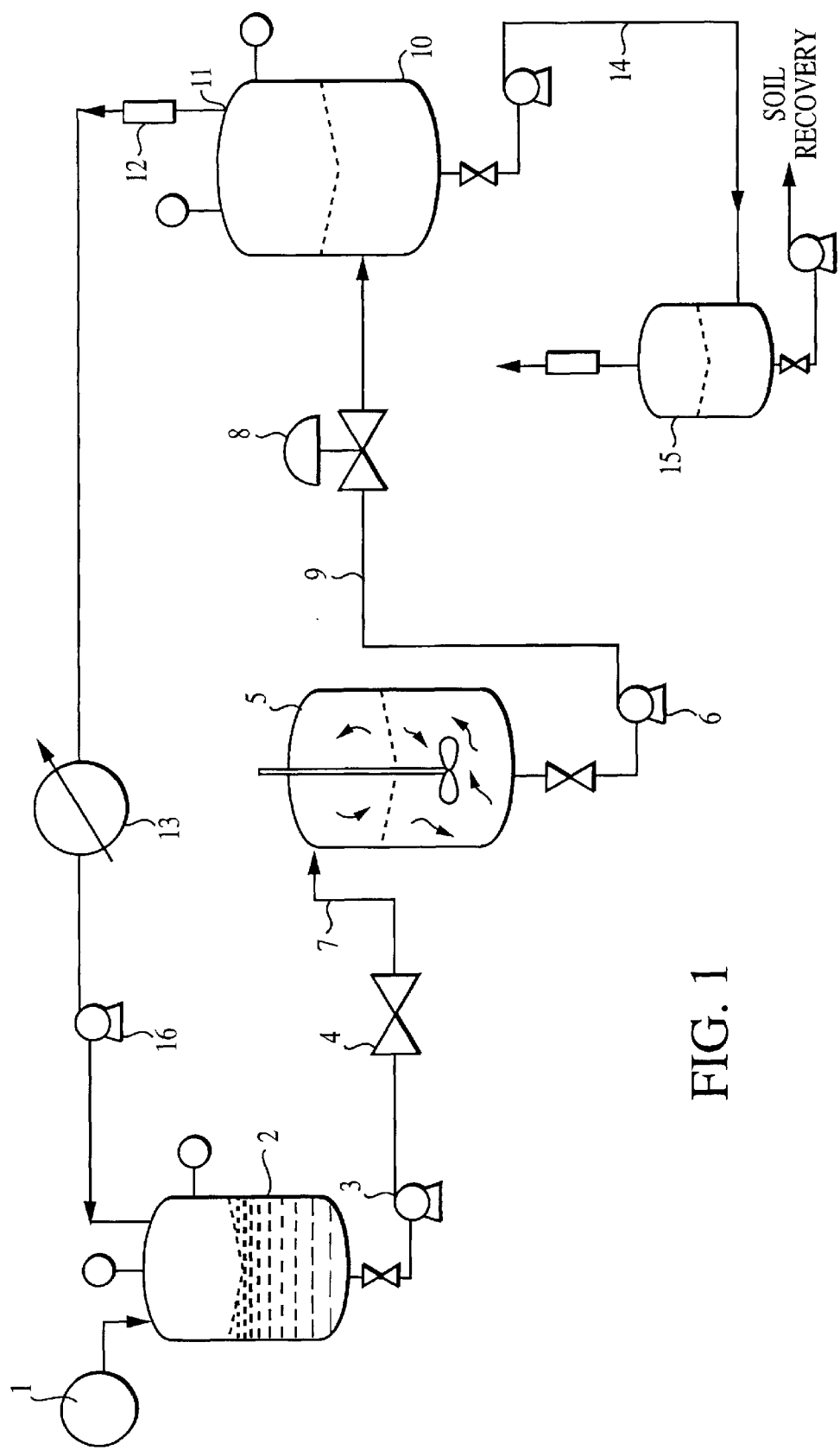
FIG. 1 is a diagrammatical flow chart of the synthesis of a condensation polymer using supercritical fluid conditions according to the invention.

The invention provides a synthesis of polyurethanes which replaces conventional solvents with densified fluids to provide polyurethane polymers free of solvent residues.

For purposes of the invention, the following definitions are used:

The term "polyol" means an alcohol compound with two or more hydroxyl groups having a molecular weight in the range of 60 to 20,000. Non-limiting examples include diols, triols, tetraols, pentaols, polyether diols, polyester diols and bisphenols. The phrase "polyol with a latent ionic functionality" means a polyol containing a weak acid or base substituent which alone cannot provide stabilization to a polymeric dispersion or emulsion, but when the polyol is neutralized with an acid or base or when reacted with a quaternizing agent the functionality provides an anionic or cationic group that is able to stabilize a polymeric emulsion or dispersion.

"Densified carbon dioxide" means carbon dioxide that has a density (g/ml) greater than that of carbon dioxide gas at 1 atm and 0° C.

"Supercritical fluid carbon dioxide" means carbon dioxide which is at or above the critical temperature of 31° C. and the critical pressure of 71 atmospheres and which cannot be condensed into a liquid phase despite the addition of further pressure.

Densified carbon dioxide, in particular supercritical fluid carbon dioxide, is preferred for use in the inventive synthesis. It is noted however that other densified molecules having supercritical properties may also be employed alone or in mixture.

These molecules include methane, ethane, propane, ammonia, butane, n-pentane, n-hexane, cyclohexane, n-heptane, ethylene, propylene, methanol, ethanol, isopropanol, benzene, toluene, p-xylene, sulfur dioxide, chlorotrifluoromethane, trichlorofluoromethane, perfluoropropane, chlorodifluoromethane, sulfur hexafluoride, nitrous oxide, monofluoromethane, isobutanol, krypton and xenon. Other supercritical compounds which may be useful are cited in the CRC Handbook of Chemistry and Physics, 67th ed., 1986–1987 published by CRC Press, Inc. of Boca Raton, Fla.

The supercritical conditions to be used for the synthesis according to the invention should be chosen according to the reactive groups and supercritical compounds used. In general, the temperature ranges between about 0° C and about 200° C., preferably 20° C. to 175° C. and most preferably 30° C. to about 100° C. The pressure during synthesis is about 14.7 psi to about 10,000 psi, preferably 700 psi to about 7,000 psi and most preferably 800 psi to about 6,000 psi. The time period for the synthesis reaction is from about ten minutes to about thirty-six hours depending on the reactant groups of the components.

The synthesis process using densified fluid conditions is diagramatically represented in FIG. 1. A main vessel 5, receives the reactant components, catalyst and any solvent modifiers such as water. The main vessel may also be referred to as a autoclave, particularly as described in the examples below.

Densified fluid is introduced into the main vessel 5 from a storage vessel 1. Much of the supercritical fluid is recycled within the system so that any losses during the synthesis process are made up through a supercritical fluid supply vessel 2. The supercritical fluid is pumped into the main vessel by a pump 3 at pressures ranging between 14.7 and 10,000 psi. The fluid is maintained in a range from about 0° C. to 200° C. by a heat exchanger 4.

During synthesis, the densified fluid is transferred from the supply vessel 2 to the main vessel 5 through line 7 for the reaction period. At the end of the synthesis process, spent fluids are transferred through an expansion valve 6, a heat exchanger 8 by way of a line 9 into a flash drum 10. In the flashdrum, pressures are reduced to between about 700 and about 1,000 psi and to a temperature of about 20° C. to about 200° C. Gaseous solvent is separated from the formed polymers and transferred via line 11 through a filter 12 and a condenser 13 to be recycled back to the supply vessel 2. Residue solvent is transferred via line 14 to an atmospheric tank 15 where the remaining solvent is vented to the atmosphere.

Polyurethane

The polyurethane systems of interest are formed by the reaction of a di-or polyisocyanate and a polyol, alone or with another active hydrogen compound typically in the presence of a catalyst. The polyol and optionally selected additional polyols are combined with the di- or polyisocyanate in a ratio of 0.1:1.0 to 2.0:1.0 isocyanate groups to active hydrogens. The urethane polymerization is carried out in the reaction medium with or without typical urethane reaction catalysts known in the art. Suitable catalysts include dibutyl tin dilaurate; the stannous salts of carboxylic acids having from 2 to 18 carbon atoms, such as, stannous laurate, stannous stearate, stannous acetate, stannous butyrate, stannous octoate and the like, and mixtures of those. Other suitable catalysts include dibutyl tin oxide, dibutyl tin sulfide, lead resinate, lead benzoate, lead salicylate, lead 2-ethyl hexoate, lead oleate, iron acetyl acetonate, cobalt benzoate, tetra (2-ethyl hexyl) titanate, tetra butyl titanate, and the like. Many other compounds accelerate the reaction of a hydroxyl or other groups with an isocyanate in preference to certain other reactions of the isocyanate group, and any of these compounds may be used. Those skilled in the art will choose a specific catalyst to confer desired characteristics to individual urethane reactions. The preceding specific compounds are the preferred compounds and are given for the purpose of illustration and not limitation. In addition, any suitable tertiary amine may be used alone or with the metallic catalyst, for example, triethylene diamine, N-ethyl morpholine, N-methyl morpholine, or 4-dimethylaminoethyl piperazine.

In practice, compounds with two or more active hydrogens (e.g. —OH,—$CO_2H$, —NRH,—SH functionality) can be condensed with a di-or polyisocyanate to yield polyurethane products. This process is more fully described in the Encyclopedia of Polymer Science and Engineering, 2nd Ed., V. 13, pp. 243–303 and is herein incorporated by reference.

The preparation of waterborne polyurethanes typically requires that the active hydrogen species contain an ionic or latent ionic group, such as dimethylolpropionic acid, to promote water dispersability. These polymers which show hydrophilic ionic sites between predominantly hydrophobic chain segments spontaneously form stable dispersions in water. High molecular weight waterborne polyurethanes can be synthesized by the reaction of the polyisocyanate with active hydrogen species containing the ionic or latent ionic functionality and optionally in combination with other non-ionic active hydrogen species. The ionic or latent ionic functionality on the polymer is then neutralized to increase the water dispersability of the final polymer.

Polyisocyanate

The polyisocyanate is an organic polyisocyanate or an organic compound that contains at least two isocyanate groups and includes the hydrocarbon diisocyanates such as the alkylene diisocyanates and the arylene diisocyanates as well as known triisocyanates and polymethylene poly (phenylene isocyanates).

Polyisocyanates which are useful in the invention are:

2,4'diisocyanatotoluene
methylene bis(4-cyclohexyl isocyanate)
1,3-diisocyanatopropane
1,4-diisocyanatobutane
1,6-diisocyanatohexane
bis(3-isocyanatopropyl)sulfide
1,5-diisocyanato-2,2-dimethylpentane
tetramethylxylenediisocyanate
1,8-diisocyanatooctane
1,9-diisocyanatononane
1,11-diisocyanatoundecane
1,4-diisocyanatobenzene
2,6-diisocyanatotolylene
1,3-d iisocyanato-m-xylene
2,4-diisocyanato-1-chlorobenzene
2,5-diisocyanato-1-nitrobenzene
3,3-diphenyl-methylene diisocyanate
isophorone diisocyanate
2,6-diisocyanatotoluene
1,2-diisocyanatoethane
1,2-diisocyanatopropane
1,5-diisocyanatopentane
bis(3-isocyanatopropyl)ether
1,7-diisocyanatoheptane
1,6-diisocyanato-3-methoxyhexane
1,5-diisocyanato-2,2,4-trimethypentane
1,10-diisocyanatopropyl)ether of 1,4-butylene glycol
1,12-diisocyanatododecane bis(isocyanatohexyl) sulfide
2,4-diisocyanatotolylene
1,2-diisocyanato-o-xylene
1,3-diisocyanato-p-xylene
2,4-diisocyanato-1-nitrobenzene
4,4-diphenylmethylene diisocyanate
polymethylene poly (phenyleneisocyanates)

and mixtures thereof. Other useful and commercially available diisocyanates are described in Kirk-Othmer Encyclopedia of Chemical Technology, 3rd Ed., V. 23, pp. 576–608.

The preferred polyisocyanates are 2,4-tolylene diisocyanate, 2,6-tolylene diisocyanate, methylenebis(4-cyclohexylisocyanate), methylene bis(4-phenylisocyanate), tetramethylxylenediisocyanate and polymeric isocyanate.

Polyols

The polyols used in forming the polyurethane may be an organic diol, triol, tetraol, pentaol, and the like. Compounds which are useful include ethylene glycol, diethylene glycol, triethylene glycol, tetraethylene glycol, 1,2-propylene glycol, di-1,2-propylene glycol, tri-1,2-propylene glycol, tetra-1,2-propylene glycol, 1,4-butanediol, 1,6-hexanediol, 1,3-propanediol, dimethylolpropionic acid, 2,2-dimethyl-1, 3-propane diol, 1,4-cyclohexanedimethanol, polyester diols, polyetherdiols and perfluorinated polyether polymer modifiers having a formula —CF$_2$O—[(CF$_2$CF$_2$O)$_P$—(CF$_2$O)$_Q$]—CF$_2$— wherein p is 0–50 and q is 0–50.

Preferred polyols include the propylene glycols, 1,4-butanediol, 1,3-propanediol, dimethylolpropionic acid, polyether diols, polyester diols commercially available as the Rucoflex™ polyester diols supplied by Rucopolymer Co. of Hicksville, N.Y. 11802 and the perfluorinated polyether polymer modifiers commercially available as the Fluorolink™ polymer modifier series commercially available from Ausimont U.S.A., Inc. Morristown, N.J. 07962-1838.

The polyols with ionic or latent ionic functionalities utilized for preparing the waterborne polyurethanes can contain either cationic or anionic groups. Compounds which are useful include dimethylolpropionic acid, dimethylolbutanoic acid, dimethylolpentanoic acid, diethylolpropionic acid, diethylolbutanoic acid, 1,4-dihydroxy-2-butane sulfonic acid, 1,5-dihydroxy-2-pentane sulfonic acid, 1,5-dihydroxy-3-pentane sulfonic acid, 1,3-dihydroxy-2-propane sulfonic acid, dimethylolethane sulfonic acid, N-methyldiethanolamine, N-ethyidiethanolamine, N-propyidiethanolamine, N,N-dimethyl-2-dimethylolbutylamine, N,N-diethyl-2-dimethylolbutylamine, N,N-dimethyl-2-dimethylolpropylamine.

Preferred polyols with ionic or latent ionic functionalities include dimethylolpropionic acid, dimethylolbutanoic acid, 1,4-dihydroxy-2-butane sulfonic acid, dimethylolethane sulfonic acid, N-methyldiethanolamine, N-ethyidiethanolamine, N,N-dimethyl-2-dimethylolbutylamine, N, N-diethyl-2-dimethylolbutylamine.

The polyols may also be formed by the alkoxylation of a starter polyol such as the class of polyols of the formula below or formed from a reaction of the above diols, triols, etc., with caprolactone. The resulting ester polyols ("tone's") are widely used in reactions with isocyanates. Desirable alkoxylated polyols are alkylene oxide adducts of a hydroxylated alcohol of the formula:

and preferably a "starter" diol, triol, tetraol and higher hydroxylated alcohols of the formula "A(OH)>2–6 wherein A is a polyvalent organic moiety, the free valence of which is 2–6 or greater, or an average value equal thereto as the case may be.

Optional Hydrogen Active Species

The organic compounds that are reactive with isocyanate and that may be used for the preparation of the polyurethane polymers of this invention have two or more active hydrogen atoms (as determined by the Zerewitinoff method). The active hydrogen atoms are usually attached to oxygen, nitrogen or sulfur atoms. These compounds will have a molecular weight of about 60 to 20,000, preferably about 60 to 8,000. Preferably, these compounds will be linear in order to prevent gelling during polymerization, but small amounts of non-linear compounds may be used provided their use does not cause gelling. The organic compounds will be present in an amount of 10–90% by weight of the polyurethane, preferably in an amount of 15–70% by weight.

The preferred organic compounds with two active hydrogen atoms are the linear difunctional polyethylene and polypropylene glycols, especially those that are available commercially and produced by the reaction of ethylene (or propylene) oxide with water, ethylene (or propylene) glycol, or diethylene (or dipropylene) glycol in the presence of sodium hydroxide as a catalyst. These polyglycols have molecular weights of about 600 to 20,000, preferably about 1,000 to 8,000. Polyglycols that are homogeneous in molecular weight, or a mixture of glycols that differ in molecular weight can be used. It is also possible to copolymerize small amounts of additional alkylene oxides into the polyglycol.

Other suitable organic compounds with two active hydrogen atoms are those having hydroxyl, carboxyl, amino or mercapto groups. Among these, the preferred are polyhydroxy compounds, such as, polyether diols, polyester diols, polyacetal diols, polyamide diols, polyester polyamide diols, poly(alkylene ether) diols, polythioether diols, and polycarbonate diols. Compounds that contain two or more different groups within these classes may also be used, for example, amino alcohols and amino alcohols containing two amino groups and one hydroxyl group.

Suitable polyether diols are, for example, the condensation products of ethylene oxide, propylene oxide, butylene oxide, or tetrahydrofuran, and their copolymerization, graft or block polymerization products, such as, mixed ethylene oxide, propylene oxide condensates, and the graft polymerization products of the reaction of olefins under high pressure with the mentioned alkylene oxide condensates. Suitable polyethers are prepared by the condensation of the mentioned alkylene oxides with polyhydric alcohols, such as, ethylene glycol, 1,2-propylene glycol and 1,4-butanediol.

Suitable polyester diols, polyester amide diols, and polyamide diols are prerferably saturated, and are obtained, for example, by the reaction of saturated or unsaturated polycarboxylic acids with saturated or unsaturated polyhydric alcohols, diamines, or polyamines. Suitable carboxylic acids for preparing these compounds include, for example, adipic acid, succinic acid, phthalic acid, terephthalic acid, and maleic acid. Suitable polyhydric alcohols for preparing the polyesters include, for example, ethylene glycol, 1,2-propylene glycol, 1,4-butanediol, neopentyl glycol, and hexanediol. Amino alcohols, for example, ethanolamine, are also useful. Suitable diamines for preparing the polyester amides and polyamides are, for example, ethylene diamine and hexamethylene diamine.

Suitable polyacetals can be prepared, for example, from 1,4-butanediol or hexanediol and formaldehyde. Suitable polythioethers can be prepared, for example, as the condensation products of thiodiglycol either alone or in combination with other glycols, such as, ethylene glycol, 1,2-propylene glycol or with other polyhydroxy componds as disclosed above. Polyhydroxy compounds that already contain urea or urethane groups, and natural polyols, which may be further modified, for example, castor oil and carbohydrates, may also be used.

It is critical that the selected polyols of the process have some solubility in the dense fluid medium, at least 0.001 wt. % in the dense fluid medium, preferably at least 0.01 wt. % in the dense fluid medium. It is especially critical that the ionic or latent ionic containing active hydrogen species be preneutralized before polymer synthesis in order to increase the solubility of the reagent in the dense fluid solution.

Polyurethane Prepolymers

Polyurethanes may alternatively be processed by preparing a prepolymer which is subsequently chain extended. When chain extending, the di- or polyisocyanate and the polyol used to prepare the prepolymer must be present in a ratio of greater than 1:1 isocyanate groups to active hydrogens. Use of a prepolymer controls the molecular weight and viscosity of the resulting polymer. The process involves reacting an excess of a di- or polyisocyanate with relatively high molecular weight polyols, particularly diols to produce an isocyanate terminated prepolymer that is then allowed to react with a stoichiometric equivalent of a low molecular weight chain extending agent. This process is more fully described in the Encyclopedia of Polymer Science and Engineering, 2nd ed., V. 13, pp. 274–275 herein incorporated by reference.

In preparing the polyurethane prepolymer, in addition to the organic compound having at least two active hydrogen atoms, which in many cases is a high molecular weight compound, it may be desirable to chain extend the prepolymer using an organic compound with a lower molecular weight, preferably less than about 300 and more than 50. Typical chain extending agents include saturated or unsaturated glycols, such as, ethylene glycol, diethylene glycol, triethylene glycol and the like; amino alcohols, such as, ethanolamine, propanolamine, butanolamine, and the like; mono- and dialkoxylated aliphatic, cycloaliphatic aromatic and heterocyclic primary amines, such as, N-methyldiethanolamine, N-oleyldiethanolamine, N-cyclohexyl diisopropanolamine, N,N-dihydroxyethyl-p-toluidine, N,N-dihydroxy-propyinaphthylamine and the like; diamines, such as ethylene diamine, piperazine, N-N-bis-gamma-aminopropyl-N-methyl-amine and the like; carboxylic acids including aliphatic, cycloaliphatic, aromatic and heterocyclic dicarboxylic acids, such as, oxalic acid, malonic acid, succinic acid, glutaric acid, adipic acid, sebacic acid, terephthalic acid, 1,5-dicarboxylic naphthalic acid, maleic acid, fumaric acid, diglycolic acid, quinolinic acid, lutidinic acid and the like; amino carboxylic acids, such as, glycine, alpha and beta-alanine, 6-aminocaproic acid, 4-aminobutyric acid, p-aminobenzoic acid, 5-aminonaphtholic acid and the like. The preferred chain extending agents are aliphatic diols and diamines.

Waterborne polyurethanes are conventionally prepared by initially synthesizing low molecular weight prepolymers and then chain extending the prepolymers in an aqueous or aqueous/organic solvent system. The prepolymers are synthesized using an active hydrogen species containing an ionic or latent ionic group, such as dimethylolpropionic acid, to promote water dispersability. The prepolymers are traditionally neutralized before the chain extension reaction to promote the dispersability of the prepolymer in the aqueous or aqueous/solvent medium.

In the inventive synthesis, it is critical that the ionic or latent ionic active hydrogen species be preneutralized before the preparation of the prepolymer in the dense fluid medium to increase the solubility of the reagent. This prepolymer can be isolated and then chain extended in an aqueous medium or can be directly chain extended in an aqueous/dense fluid medium, since the prepolymer is already neutralized and highly dispersable in the aqueous medium.

Diamines are a special class of chain extenders that may also be used to chain extend an isocyanate prepolymer in water or the water/dense fluid medium. Such diamines are, for example, ethylene diamine and piperazine.

Modifiers

A small quantity of a modifier may be added to accelerate the condensation reaction provided that the resulting polymer is substantially free of all of the modifier, preferably less than about 1% by weight. Preferred amounts of modifier added to the supercritical fluid are up to about 10% by volume, more preferably up to 5% by volume, most preferably up to about 3%. Preferred modifiers include ethanol, acetone, hexane, methanol, glycols, acetonitrile, $C_{1-10}$ alcohols and $C_{5-15}$ hydrocarbons. Especially preferred solvents include $C_{5-15}$ hydrocarbons, acetonitrile and acetone.

The following Examples will serve to distinguish this invention from the prior art and illustrate its embodiments more fully. Unless otherwise indicated, all parts, percentages and proportions referred to are by weight.

EXAMPLE 1

The solubility of various monomers was tested qualitatively using a stainless steel, high pressure view cell equipped with two sapphire windows. The view cell (11 mL volume) was loaded with 400 mg of monomer, heated to 40° C. and pressurized to 3000 psi. Qualitative visual analysis of the solution indicated either no solubility, partial solubility or total solubility. The results of the solubility tests are listed in the following table.

| Monomer | wt/vol% | Solubility |
|---|---|---|
| Methylene di-p-phenyl diisocyanate (MDI) | 4 | Total |
| Methylene di-p-cyclohexyl diisocyanate (H12MDI) | 4 | Total |
| Fluorinated polyether (mw 2100)[1] | 4 | Total |
| Dimethylolpropionic acid, triethylamine salt (DMPA/TEA) | 4 | Total |

[1]fluorinated polyether having the chemical structure HO($CH_2CH_2O$)$_n$$CH_2CF_2OO(CF_2CF_2O)_p(CF_2O)_qCF_2CH_2O(CH_2CH_2O)_n$H supplied as Fluorolink E by Ausimont USA, Inc.

EXAMPLE 2

The synthesis of a number of polyurethanes was conducted in the stainless steel, high pressure view cell. The monomers were added at various mole ratios to the cell. The cell was filled with carbon dioxide to tank pressure (800 psi) and then heated to 40–45° C. Finally, the cell was pressurized to the desired operating pressure, and the reaction was stirred overnight.

A polyurethane composed of methylene di-p-phenyl diisocyanate (0.134 mmole) and Fluorolink E[1] (0.137 mmole) was synthesized in supercritical carbon dioxide. A catalytic amount of dibutyltindilaurate was used to promote the reaction. The monomers were mixed with the catalyst in a stainless steel, high pressure view cell. The cell was heated to 42° C. and pressurized to 3000 psi with carbon dioxide and stirred overnight. The carbon dioxide was released, and a white, rubbery solid was obtained.

EXAMPLE 3

According to the procedure in Example 2, a polyurethane was synthesized in supercritical carbon dioxide from a mixture of three monomers, MDI, Fluorolink E and DMPA/TEA. DMPA/TEA was added at a level that would give 13 wt % in the final polymer. The monomers were reacted for 20 hours at 42° C. and 3000 psi. The IR spectrum of the brittle solid white product, isolated upon pressure reduction, showed a urethane stretch at 1733 $cm^{-1}$ and unreacted isocyanate at 2923 $cm^{-1}$. The IR analysis and final product form indicated that polymerization had occurred to form the polyurethane with some unreacted isocyanate remaining.

EXAMPLE 4

A synthetic procedure used to prepare higher molecular weight polyurethanes involves initially synthesizing a polyurethane "prepolymer" which contains reactive isocyanate endgroups. The prepolymers are typically prepared using an excess of the diisocyanate to ensure that reactive isocyanate endgroups are present on the prepolymer and to control the molecular weight. This prepolymer is then chain extended with a diamine to form higher molecular weight polymers. These prepolymers and their subsequent aqueous emulsions can be prepared in supercritical fluids and then chain extended with the diamine upon isolation of the prepolymer or prepolymer emulsion from the supercritical fluid.

A prepolymer was prepared in the view cell, following the procedure in Example 2, from H12MDI, DMPAlTEA and Fluorolink E with a small amount of dibutyltindilaurate catalyst. The reaction occurred at 3400 psi and 57° C. for 18 hours. An excess of H12MDI was used to ensure the presence of isocyanate end groups in the final prepolymer and to control the molecular weight. A back titration method with hydrochloric acid and a known excess amount of n-butylamine indicated that there were free isocyanate groups present in the synthesized prepolymer.

EXAMPLE 5

In a manner similar to that in Example 4, a "prepolymer" was synthesized in supercritical carbon dioxide from MDI, DMPA/TEA, and Fluorolink E in a 50 ml Hastelloy autoclave. The reaction was conducted at 3000 psi and 44° C. for 16 hours. Following the reaction in carbon dioxide, water (2×2.4 ml) was added under pressure using a high pressure syringe pump to initiate emulsion formation. This aqueous mixture was stirred for one hour, followed by release of carbon dioxide pressure and addition of a further 25 ml of water with stirring for one hour.

EXAMPLE 6

The "prepolymer" of Example 5 was chain extended with ethylenediamine to increase the molecular weight of the polymer. An excess of ethylenediamine was added to the aqueous suspension of the prepolymer and the mixture was stirred overnight. The solids were partially emulsified, and the emulsion was dried to give a clear film on glass.

EXAMPLE 7

In a manner similar to that in Example 5, a polyurethane "prepolymer" was synthesized from H12MDI (4.05 mmoles), polypropylene glycol (PPG) (0.741 mmoles), DMPA/TEA (2.46 mmoles) with a catalytic amount of dibutyltindilaurate in a 50 ml autoclave. After the reaction in supercritical carbon dioxide, water (3×2.4 ml) was added under pressure and the polymer/water/carbon dioxide mixture was stirred for one hour. Upon release of the carbon dioxide pressure, an additional 25 ml of water was added. The "prepolymer" was chain extended with an excess of ethylenediamine in a manner similar to that in Example 6. The molecular weight of the resulting polymer was determined by the method of intrinsic viscosity in 1-methyl-2-pyrrolidinone by comparison with solvent. The relative inherent viscosity of the synthesized, chain extended polymer was determined to be 0.2.

EXAMPLE 8

In a manner identical to that of Example 7, several prepolymers were prepared using different amounts of monomer. These polymers were chain extended with varying amounts of ethylenediamine into aqueous polyurethane emulsions, and molecular weights were determined by relative inherent viscosity measurements according to the following table.

| Monomer | Trial 1 | Trial 2 | Trial 3 |
|---|---|---|---|
| H12MDI | 4.05 mmoles | 4.05 mmoles | 4.05 mmoles |
| PPG 2025 | 0.741 | 0.503 | 1.01 |
| DMPA/TEA | 2.46 | 2.32 | 2.32 |
| ethylenediamine | excess | 1.2 | 1.2 |
| relative inherent viscosity | 0.20 | 0.19 | 0.16 |

EXAMPLE 9

The solubility of various diisocyanate and diol monomers in supercritical carbon dioxide can be determined using the method reported in Example 1. Various amounts of monomer are added to the high pressure view cell equipped with sapphire windows and the cell is filled with carbon dioxide at various pressures and temperatures. Qualitative solubility measurements are determined by visual analysis of the supercritical fluid solution as not soluble, partially soluble or totally miscible. By utilizing a variable volume high pressure view cell, quantitative solubility measurements can be obtained by determining the pressure at which a certain mole percent solute precipitates from solution. Besides the diisocyanates listed in Example 1, the following diisocyanates are commonly used in the industry to synthesize polyurethanes:

para-Phenyl diisocyanate (PPDI)
Toluene diisocyanate (TDI)
Polymethylenebis(phenylisocyanate) (PMDI)
Naphthalene diisocyanate (NDI)
Hexyldiisocyanate (HDI)
Tetramethylhexyldiisocyanate (TMDI)
Cyclohexyidiisocyanate (CHDI)
Xylene diisocyanate (XDI)
m-Tetramethylxylene diisocyanate (TMXDI)
Isophorone diisocyanate (IPDI)

The various solubilities of the listed diisocyanates will determine the specific conditions required for polyurethane synthesis in the supercritical fluid medium.

The solubility of the corresponding diol monomer in supercritical carbon dioxide is measured in the same manner and along with the diols listed in Example 1, the following diols are particularly useful in polyurethane synthesis:

| | |
|---|---|
| Polyethylene glycol (PEG) | Various molecular weights |
| Polypropylene glycol (PPG) | Various molecular weights |
| PPG/PEG copolymers | Various molecular weights |
| Poly(tetramethylene glycol) (PTMG) | Various molecular weights |
| Various Polyether Polyol Adducts | |
| Fluorinated Polyether Polyols | Various molecular weights |
| Fluorolink E | |
| Fluorolink D | |
| Fluorolink T | |
| Polyester diols | Low molecular weight (500–2000) |
| Polycaprolactone diols | |
| Polycarbonate diols | |
| Polybutadiene diol | |
| Polyesteramide diols | |
| 1,4-butanediol | |
| 1,6-hexanediol | |
| 1,8-octanediol | |
| Perfluoro-1,4-butanediol | |
| Perfluoro-1,6-hexanediol | |
| Bisphenol A (2,2-bis(4-hydroxyphenyl)propane) | |

Low molecular weight diols and low to medium molecular weight PPG and PPG/PEG copolymers should have some solubility in supercritical carbon dioxide. All perfluorinated diols and fluorinated polyether polyols will have moderate to high solubility in supercritical carbon dioxide.

Solubility of at least one monomer unit i.e. the diisocyanate or the diol, in supercritical carbon dioxide facilitates the formation of polyurethanes.

EXAMPLE 10

The synthesis of a number of polyurethanes is conducted in the manner presented in Example 2 by the addition of equivalent amounts of diisocyanate and diol and a small amount of catalyst in supercritical carbon dioxide at various pressures and temperatures. The reactions are allowed to proceed for 24 hours and then pressure is released and the polymer is isolated as a rubbery or brittle solid.

Toluene diisocyanate (TDI) (0.13 moles) and PPG (5,000 MW) (0.13 moles) are added to the 50 ml autoclave along with 50 mg of dibutyltin diacetate. The autoclave is pressurized to tank pressure with carbon dioxide (800 psi) and heated to 44° C. Upon reaching constant temperature, the autoclave is then pressurized to 3000 psi with more carbon dioxide and the reaction is stirred for 24 hours. The pressure is then released and a white solid polymer is isolated.

EXAMPLE 11

Following the procedure in Example 10, the following monomers are combined in the presence of 50 mg of dibutyltindilaurate as the catalyst in supercritical carbon dioxide and reacted for 24 hours at 3000 psi and 44° C.:

Toluene diisocyanate (TDI) (0.13 moles) and PEG (3000 MW) (0.13 moles)

Toluene diisocyanate (TDI) (0.23 moles) and Fluorolink E (0.23 moles)

Isophorone diisocyanate (IPDI) (0.15 moles) and PPG (7000 MW) (0.15 moles)

Isophorone diisocyanate (IPDI) (0.13 moles) and Polyester diol (0.13 moles)

Methyl-di-p-phenylisocyanate (MDI) (0.18 moles) and Perfluoro-1,4-butanediol (0.18 moles)

m-Tetramethylxylene diisocyanate (TMXDI) (0.15 moles) and PPG (5000 MW) (0.15 moles)

m-Tetramethylxylene diisocyanate (TMXDI) (0.15 moles) and Fluorolink D (0.15 moles)

EXAMPLE 12

As presented in Example 4, "prepolymer" polyurethanes are prepared in supercritical carbon dioxide and then chain extended with any number of monomers. The "prepolymers" are synthesized in a procedure similar to that detailed in Example 10. An excess of diisocyanate is used to prepare the "prepolymer" with controlled molecular weight and with isocyanate endgroups. The following monomers are reacted with 50 mg of dibutyltindiacetate as the catalyst in supercritical carbon dioxide. The prepolymers are isolated upon pressure reduction and removal of the carbon dioxide or water is added to the "prepolymer"/carbon dioxide suspension at elevated pressures and an aqueous emulsion can be formed. This emulsion is then isolated upon reduction of the pressure and removal of the carbon dioxide.

Toluene diisocyanate (TDI) (0.17 moles) and PEG (3000 MW) (0.13 moles)

Toluene diisocyanate (TDI) (0.27 moles) and Fluorolink E (0.23 moles)

Isophorone diisocyanate (IPDI) (0.19 moles) and PPG (7000 MW) (0.15 moles)

Isophorone diisocyanate (IPDI) (0.17 moles) and Polyester diol (0.13 moles)

Methyl-di-p-phenylisocyanate (MDI) (0.22 moles) and Perfluoro-1,4-butanediol (0.18 moles)

m-Tetramethylxylene diisocyanate (TMXDI) (0.19 moles) and PPG (5000 MW) (0.15 moles)

m-Tetramethylxylene diisocyanate (TMXDI) (0.19 moles) and Fluorolink D (0.15 moles)

Methyl-di-p-phenylisocyanate (MDI) (0.23 moles) and PPG/PEG copolymer (0.17 moles)

Hexane diisocyanate (HDI) (0.17 moles) and Polyester diol (0.13 moles)

Hexane diisocyanate (HDI) (0.23 moles) and Poly (tetramethylene glycol) (0.17 moles)

EXAMPLE 13

The "prepolymers" synthesized in Example 12 are isolated as a solid polymer or in an aqueous emulsion and then are subjected to further reaction with either a diamine or a diol. If the "prepolymers" from Example 12 are isolated as an aqueous emulsion, further reaction with diamines such as 1,2-ethylenediamine, 1,3-propylenediamine, 1,4-butylenediamine or piperazine is performed and the "prepolymer" is chain extended to increase the molecular weight and form poly(urea urethanes). These emulsions are then dried, and the chain extended polymers isolated as films are subjected to relative intrinsic viscosity measurements for analysis of molecular weight build-up.

EXAMPLE 14

The "prepolymers" synthesized in Example 12 also can undergo chain extension with a different low molecular weight diol. This chain extension is performed in supercritical carbon dioxide by the addition of diols such as ethylene glycol, 1,3-propane diol, 1,4-butane diol or 1,6 hexane diol to the supercritical fluid solution of the "prepolymer" at elevated pressures. The liquid diols are added to the supercritical fluid solution with a high pressure syringe pump and the reaction mixture is stirred at elevated pressures for several hours. Upon pressure reduction and release of the carbon dioxide, the polymers are isolated as white solids. These chain extended polymers are subjected to relative intrinsic viscosity measurements for analysis of molecular weight build-up.

What is claimed is:

1. A process of synthesizing a waterborne polyurethane polymer comprising the steps of
    (a) selecting a di-or polyIsocyanate;
    (b) selecting a polyol with latent ionic functionality;
    (c) treating said polyol from step (b) with an acid or a base or a quaternizing agent to express the ionic functlonality as an anionic or cationic group prior to step (d);
    (d) optionally selecting additional polyols selected from the group consisting of polyols which do not have latent ionic functionality, polyols which have latent ionic tunctionality, and combinations thereof;
    (e) combining the polyol of step (c) and the optionally selected additional polyols of step (d) with the di- or polyisocyanate in a ratio of 2.0:1.0 to 0.1:1.0 isocyanate groups to active hydrogens to form a product under densified fluid conditions using densified fluid having a pressure of from about 14.7 psi to about 10,000 psi, a temperature range of about 0° C. to about 200° C. and a time period of about ten minutes to about thirty-six hours;
    (f) dispersing the product of step (e) in water;
    (g) optionally chain extending the product of step (e) with chain extending agents, provided that the isocyanate groups to active hydrogens are present in a ratio of greater than 1:1.

2. The process according to claim 1 wherein the polyol of step (b) is a diol.

3. The process according to claim 1 wherein the polyol of step (b) is selected from the group consisting of dimethylolproprionic acid, dimethylolbutanoic acid, diethylolpropionic acid, and mixtures thereof.

4. The process according to claim 1 wherein the polyol of step (b) is selected from the group consisting of 1,4-dihydroxy-2-butane sulfonic acid, 1,5-dihydroxy-2-pentane sulfonic acid, 1,3-dihydroxy-2-propane sulfonic acid, dimethylolethane sulfonic acid, N-ethyldiethanolamine, N-methyidiethanolamine, N-propyldiethanolamine, N,N-dimethyl-2-dimethylolbutylamine, N,N-dimethyl-2-dimethylolpropylamine and mixtures thereof.

5. The process according to claim 1 wherein the additional polyol of step (d) is a diol selected from the group consisting of ethylene glycol, diethylene glycol, triethylene glycol, 1,2-propylene glycol, di-1,2-propylene glycol, a polyether diol, a polyester diol, a fluorinated polyether diol, bixphenol A, and mixtures thereof.

6. The process according to claim 1 wherein the diisocyanate is selected from the group consisting of 2,4-tolylene diisocyanate, 2,6-tolylene diisocyanate, methylene bis(4-cyclohexyl isocyanate), isophorone diisocyanate, tetramethylxylenediisocyanate, methylene bis(4-phenyl isocyanate), and mixtures thereof.

7. The process according to claim 1 wherein step (e) further comprises adding a catalyst to catalyze the reaction.

8. The process according to claim 1 wherein the chain extending agent of step (g) is a diol or diamine selected from the group consisting of ethylenediamine, propylenediamine, piperazine, ethylene glycol and propylene glycol.

9. The process according to claim 1 wherein the densified fluid is carbon dioxide.

* * * * *